United States Patent
Rajasankar et al.

(10) Patent No.: US 11,842,026 B2
(45) Date of Patent: Dec. 12, 2023

(54) INTELLIGENT PLACEMENT OF A BROWSER-ADDED USER INTERFACE ELEMENT ON A WEBPAGE

(71) Applicant: MICROSOFT TECHNOLOGY LICENSING, LLC, Redmond, WA (US)

(72) Inventors: Sushanth Rajasankar, Redmond, WA (US); Jonah Anthony Chin, Seattle, WA (US); Harneet Singh Sidhana, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/710,334

(22) Filed: Mar. 31, 2022

(65) Prior Publication Data

US 2023/0315242 A1    Oct. 5, 2023

(51) Int. Cl.
*G06F 3/0481* (2022.01)
*G06F 40/143* (2020.01)
(Continued)

(52) U.S. Cl.
CPC .......... *G06F 3/0481* (2013.01); *G06F 3/0484* (2013.01); *G06F 9/451* (2018.02);
(Continued)

(58) Field of Classification Search
CPC .... G06F 9/451; G06F 16/9577; G06F 40/143; G06F 40/106; G06F 2203/04804; G06F 3/0481; G06F 3/0484
See application file for complete search history.

(56) References Cited

U.S. PATENT DOCUMENTS 9,489,131 B2    11/2016    Seymour et al.
11,086,644 B1 *  8/2021    Balaram ................. G06F 9/453
(Continued)

OTHER PUBLICATIONS

"Position", Retrieved from: https://developer.mozilla.org/en-US/docs/Web/CSS/position, Retrieved date: Nov. 30, 2021, 21 Pages.
(Continued)

*Primary Examiner* — Daniel Samwel
(74) *Attorney, Agent, or Firm* — Newport IP, LLC; Jacob P. Rohwer

(57) ABSTRACT

Disclosed herein a browser that intelligently places a user interface (UI) element on a webpage such that the UI element appears to be integrated and coordinated with the webpage and not merely overlaid on the webpage. The intelligent placement ensures that the UI element neither obstructs the view of pertinent content displayed via the webpage nor interferes with the functionality of the webpage. Moreover, the intelligent placement ensures that the UI element is completely visible to a user. The placement of the UI element is done by the browser after the webpage has been retrieved from a web server. Consequently, the browser lacks the ability to control or alter the layout and appearance of the webpage. The UI element can be a selectable UI element that the browser associates with a function. In one example, the function can be an image-based search.

20 Claims, 12 Drawing Sheets

(51) Int. Cl.
*G06F 40/106* (2020.01)
*G06F 16/957* (2019.01)
*G06F 9/451* (2018.01)
*G06F 3/0484* (2022.01)

(52) U.S. Cl.
CPC ........ *G06F 16/9577* (2019.01); *G06F 40/106* (2020.01); *G06F 40/143* (2020.01); *G06F 2203/04804* (2013.01)

(56) References Cited

U.S. PATENT DOCUMENTS

| | | | | |
|---|---|---|---|---|
| 2007/0033269 | A1* | 2/2007 | Atkinson | H04L 67/53 |
| | | | | 709/219 |
| 2010/0074321 | A1* | 3/2010 | Beaudreau | H04N 19/85 |
| | | | | 375/E7.076 |
| 2011/0137989 | A1* | 6/2011 | Kiciman | G06Q 30/02 |
| | | | | 707/706 |
| 2011/0227952 | A1* | 9/2011 | Hamaguchi | G09G 5/38 |
| | | | | 345/672 |
| 2012/0131483 | A1* | 5/2012 | Archer | G06F 3/0486 |
| | | | | 715/766 |
| 2012/0235912 | A1 | 9/2012 | Laubach | |
| 2015/0262255 | A1* | 9/2015 | Khajehnouri | G06Q 30/0276 |
| | | | | 705/14.66 |
| 2017/0032553 | A1* | 2/2017 | O'Donovan | G06K 9/6271 |
| 2017/0371853 | A1* | 12/2017 | Durbin | G06F 40/106 |
| 2018/0300771 | A1* | 10/2018 | Roger | G06Q 30/0277 |
| 2019/0339834 | A1* | 11/2019 | Weiner | G06F 40/14 |
| 2020/0133644 | A1 | 4/2020 | Hou | |
| 2021/0110786 | A1 | 4/2021 | Cheon et al. | |
| 2021/0151008 | A1* | 5/2021 | Chrapek | G06F 3/011 |
| 2021/0240451 | A1 | 8/2021 | Schoppe et al. | |

OTHER PUBLICATIONS

"Understanding Auto Layout", Retrieved from: https://developer.apple.com/library/archive/documentation/UserExperience/Conceptual/AutolayoutPG/index.html, Retrieved date: Nov. 30, 2021, 6 pages.

Eygi, Cem, "How to use the position property in CSS to align elements". Retrieved from: https://www.freecodecamp.org/news/how-to-use-the-position-property-in-css-to-align-elements-d8f49c403a26/, Sep. 18, 2018, 20 Pages.

* cited by examiner

INTELLIGENT PLACEMENT OF A BROWSER-ADDED USER INTERFACE ELEMENT ON A WEBPAGE

BACKGROUND

Computing devices (e.g., desktop devices, laptop devices, tablet devices, smartphone devices) use a web browser to access websites. A web browser may alternatively be referred to an Internet browser, or merely a browser. When a computing device requests a webpage from a particular website based on instructions from a user, the web browser retrieves the webpage from a web server and then displays the webpage via a display screen that is part of the computing device or that is connected to the computing device.

A website often includes multiple webpages linked together in an organized fashion. A webpage typically includes files written in a markup language such as Hypertext Markup Language (HTML). A markup language enables a web developer to semantically describe the structure and the appearance of content displayed on the webpage. The content can include different elements and/or different types of elements. In one example, an element of a webpage can include an embedded multimedia file such as an image (e.g., a photograph, a video). A webpage also includes code written in a programming language such as JAVASCRIPT. The programming language enables the web developer to define interactivity in the webpage (e.g., changes in the content of the webpage, reactive behavior of the webpage). Furthermore, the webpage can also include Cascading Style Sheets (CSSs) for presentation semantics. For example, the code written in a CSS enables the web developer to define various styles and design for an element in the webpage, including a color of the element, a font for the element, etc. Consequently, "webpage code" or "code for the webpage" can include the files written in a markup language, the programming language code, and/or the CSS.

A browser uses a layout component (e.g., a layout process) to display the content of the webpage using the webpage code. In various scenarios, the browser is configured to overlay additional content on top of the content of the webpage. This additional content is not part of the webpage, and therefore, the browser typically uses an overlay component (e.g., an overlay process), that is different than the layout component, to display the additional content in an overlay layer. In one example, the additional content may indicate or introduce a new browser or other device-based feature to a user. In another example, the additional content may include an advertisement.

To simplify the process, the browser typically displays this additional content in the overlay layer with no regard to the underlying content of the webpage. More specifically, the browser positions an added element in the overlay layer with no understanding of the positions of actual elements of the webpage. Consequently, the added element may obstruct the view of the content of the webpage. Furthermore, the added element may interfere with, or even completely disable, some of the functionality on the webpage. For instance, the added element may make it impossible for a user to select an icon on the webpage. Ultimately, this may frustrate and/or alter the intended viewing experience for the webpage defined by the web developer.

It is with respect to these and other considerations that the disclosure made herein is presented.

SUMMARY

The techniques disclosed herein implement a browser configured to intelligently place a user interface (UI) element on a webpage such that the UI element appears to be integrated and coordinated with the webpage. Stated alternatively, the UI element is not merely overlaid on the webpage. The intelligent placement ensures that the UI element neither obstructs the view of pertinent content displayed on the webpage nor interferes with the functionality of the webpage. Moreover, the intelligent placement ensures that the UI element is completely visible to a user viewing the webpage. The placement of the UI element is done by the browser after the webpage has been retrieved (e.g., downloaded) from a web server. Therefore, the browser lacks the ability to control or alter the layout and appearance of the content of the webpage.

The browser is configured to analyze the webpage code so that the UI element can be added to the webpage without any assistance from the web developer. The UI element can be a selectable UI element (e.g., an icon, a button) that the browser associates with a function. The function can be implemented, or at least initiated, on the browser-side. Accordingly, the function is not one that is part of the webpage and the UI element may be referred to herein as a "browser-added" UI element.

In one example, the function can be an image-based search function that uses characteristics of an image (e.g., graphical characteristics, text descriptions in the image metadata, captions) that is displayed on the webpage. Upon detecting a user interaction with the browser-added UI element, the browser can be configured to call on an image search engine to retrieve content from, and/or provide links to, other websites that may contain images that are similar to the image that is displayed via the webpage. That is, the image search engine can use the characteristics of the image to search for similar images on the Internet.

In a specific example, the image-based search function can be useful when a user is shopping for an item on a first website yet wants to compare the price of the item on the first website to prices of the same item or similar items on other websites with the hope of finding the same or a similar item for a cheaper price. In another example, the image-based search function can be useful when a user is viewing a news article regarding a particular topic on a first website and wants to find similar news articles regarding the particular topic on other websites. To enhance the user experience and provide efficient access to useful functionality, the browser may be configured to place the browser-added UI element on each of multiple different images currently being displayed on a webpage. Browser-side functions other than an image-based search function are also contemplated in the context of this disclosure.

In the context of image-based search, the browser is configured to place the browser-added UI element on an underlying image displayed on the webpage. To ensure that the user experience with regard to viewing and interacting with the webpage is not frustrated by the browser-added UI element, it is important for the browser to place the browser-added UI element in a layout position that does not interfere with existing functionality of the webpage. To prevent any potential interference with existing functionality of the webpage, the browser is configured to insert the browser-added UI element in the same display layer as the image. The display layers may be defined by a z-order of a Cascading Style Sheet (CS S). Accordingly, the browser inserts the browser-added UI element in to a display layer that is configured below display layers that include webpage elements (e.g., selectable icons on an image).

Furthermore, it is important for the browser to attempt to place the browser-added UI element on different images in a consistent manner (e.g., in consistent layout positions). If the browser-added UI element is not placed on different images in a consistent manner, the user is likely to perceive the browser-added UI element as being a random UI element and/or a distractive UI element placed over the content of the webpage. Even worse, the user may perceive the browser-added UI element as being a website compatibility issue that affects the rendering of the webpage.

One placement approach displays the browser-added UI element on an image using preconfigured offsets. This placement approach is a general solution applied to images displayed on webpages from different websites. For instance, the placement approach always places the browser-added UI element in the upper right corner of an image, a certain distance from the top edge of the image and a certain distance from the right edge of the image. This may be referred to as "static" positioning. However, this placement approach presents some problems. A first problem relates to the fact that webpages often include their own UI elements that crop an image so that the user is unable to view the whole image when the webpage is displayed. Stated alternatively, the actual image included in the webpage is often much larger than the part of the image that is visible to the user when the webpage is displayed.

These UI elements that crop the image may be referred to as "ancestor" elements and are configured by a developer of the webpage using the z-order in a CSS. Accordingly, an image with a z-index property of "1" in the z-order is cropped by an ancestor element with a z-index property of "2" in the z-order when the layout positions of the image and ancestor element overlap. Generally, an element with a greater z-index property in a z-order is in front of, or placed on top of, another element with a lower z-index property in the z-order. Stated alternatively, the element with the greater z-index property in the z-order is configured in a higher layer compared to the layer of the other element with the lower z-index property in the z-order. One reason a web developer includes these ancestor UI elements that crop an image is to prevent a user from copying the image via the webpage. Consequently, if the browser-added UI element is statically positioned in the same layer as an image using preconfigured offsets, there is a chance that the browser-added UI element is oddly clipped by an ancestor element, or even worse, the browser-added UI element is completely invisible because its view is fully obstructed by an ancestor element.

A second problem for the aforementioned placement approach relates to the fact that different websites have distinctly different experiences with regard to UI elements that are already placed on images. These elements are referred to herein as "existing" UI elements, as they exist on a webpage before the browser adds the browser-added UI element. In one example, a website that offers items for sale may display an existing text UI element at the top of the images. The existing text UI element may indicate which image out of a series of images is being displayed for an item (e.g., "Image 1 of 3", "Image 2 of 3", "Image 3 of 3"). A different website may display the same existing text UI element at the bottom of the images. In another example, some websites that offer items for sale may display an existing text UI element that indicates a price of the item on the image, while other websites do not. Other types of existing UI elements that may potentially interfere with the placement of the browser-added UI element are commonly used (e.g., selectable UI elements to flip back and forth through a series of images, a selectable UI element to receive feedback such as a heart or thumbs-up). These different existing UI elements, and more importantly, the variations from one website to the next with regard to the number of existing UI elements, the positioning of the existing UI elements, and/or the size of existing UI elements, etc., has a significant effect on the ability for the browser to place the browser-added UI element on images from different webpages and/or websites. This is because the browser does not want the browser-added UI element to obstruct the view of the existing UI elements nor interfere with the functionality of the existing UI elements (e.g., the ability for a user to select an existing UI element).

With this in mind, a browser executing on a computing device, as described herein, implements a dynamic approach that intelligently places the browser-added UI element on a given image based on the layout and configuration of ancestor elements and/or existing UI elements displayed on the image. Because the browser-added UI element is not merely inserted in an overlay layer, the techniques described herein are implemented by the layout component of the browser. More specifically, by using the layout component of the browser, the browser can insert the browser-added UI element in the same z-index (e.g., same layer) as the image. This ensures that the browser-added UI element has no chance of interfering with the functionality of existing UI elements already positioned on the image of the webpage. Using this intelligent placement that inserts the browser-added UI element within the content of the webpage, the browser-added UI element is more likely to be perceived, by a user, as being an actual part of the webpage.

As described herein, the browser is configured to examine the code for a webpage that is displayed, or is to be displayed, via a display screen associated with a computing device on which the browser is installed. As described above, the code for the webpage can include files written in a markup language such as Hypertext Markup Language (HTML), scripts written in a programming language such as JAVASCRIPT, and/or CSSs. Based on the examination of the code, the browser identifies an image as an element of the webpage, as well as a layout position of the image. For example, the HTML can describe layout positioning attributes for the image such as an alignment, a margin, an image height (e.g., in pixels), an image width (e.g., in pixels), and so forth.

Next, the browser determines a part of the image that is visible on the webpage. To do this, the browser determines if any ancestor elements overlap the layout position of the image, and as a result crop or clip the image. If the browser determines that no ancestor elements overlap the layout position of the image, then the visible part of the image is the whole image. However, if the browser determines that ancestor elements do overlap the layout position of the image, then the visible part of the image is not the whole image.

The layout component of the browser can identify the ancestor elements by analyzing a z-order in a CSS. For instance, the CSS may define that an ancestor element has a z-index (e.g., 2, 3, 4) in the z-order that is greater than the image's z-index (e.g., 0, 1) in the z-order. Moreover, the layout component of the browser can examine the webpage code to determine the layout positions of the ancestor elements. Once the ancestor elements are identified and their layout positions are determined, the browser can compute the boundaries that enclose a display screen area corresponding to the visible part of the image.

In one example, the boundaries form a rectangle (e.g., a left edge boundary, a top edge boundary, a right edge boundary, a bottom edge boundary) that defines the part of the image that is visible on the webpage. That is, a left edge boundary and a right edge boundary may be defined via a pixel height for the rectangle, while a top edge boundary and a bottom edge boundary may be defined via a pixel width for the rectangle.

Once the visible part of the image is known, the browser implements a region hit test on the visible part of the image. Stated alternatively, implementation of the hit test is localized to the area (e.g., rectangle) enclosed by the boundaries. This hit test enables the browser to identify a layout position of an existing UI element (e.g., selectable or not selectable) that intersects with the visible part of the image. In other words, the hit test enables the browser to identify a layout position of an existing UI element that is located in a display layer on top of the visible part of the image.

For instance, the browser uses a coordinate space (e.g., x-y coordinate space) for the enclosed area to obtain information (e.g., feedback) regarding whether a user-controlled pointer element (e.g., a mouse cursor or a touch-point on a touch-screen interface) would intersect with the visible part of the image at a particular point (e.g., a pixel) in the coordinate space. The hit test may be conducted on all the points within the enclosed area, or a sampled set of points. If an intersection with the visible part of the image occurs at a particular point, the browser determines that there is no existing UI element at the particular point. If an intersection with the visible part of the image does not occur at a particular point, the browser determines that that there is an existing UI element at the particular point. The browser can aggregate or cluster non-intersecting points to identify the layout position (e.g., the height and the width) of the existing UI element Now that the browser knows the part of the image that is visible on a display screen and/or the layout positions of existing UI elements displayed on top of the visible part of the image, the problems discussed above with respect to visibility, obstruction, and/or interference can be addressed. That is, the browser is configured to apply a best fit placement policy that enables dynamic identification of a layout position for the browser-added UI element on the visible part of the image. The layout position for the browser-added UI element is within the boundaries of the visible part of the image and avoids overlapping the layout positions of the existing UI elements. The best fit placement policy attempts to achieve consistent placement for the browser-added element. For example, the best fit placement policy may define a preferred layout position that has a vertical element and a horizontal element (e.g., upper right corner of the visible part of the image). The best fit placement policy attempts to place the browser-added UI element in the preferred layout position. However, this placement is dependent on whether the browser-added UI element would interfere with existing UI elements.

Accordingly, the best fit placement policy can define flow directions for both an x-axis (e.g., right to left, left to right) and a y-axis (e.g., top to bottom, bottom to top) for consistent placement of the browser-added UI element across images on different websites. The flow directions are defined by the preferred placement position. Thus, the browser is configured to sort the existing UI elements in the flow directions and identify the first position along each flow direction where the browser-added UI element fits.

The best fit placement policy may prioritize one of the flow directions in case of a conflict with an existing UI element. For example, if the best fit placement policy attempts to place the browser-added UI element in the upper right corner but an existing UI element is already positioned there, a priority factor can indicate whether to first move from right to left in the horizontal direction (e.g., along the x-axis) or to first move from top to bottom along the vertical direction (e.g., along the y-axis) for the alternative placement. Thus, assuming no interference with an additional existing UI element, the priority would determine whether the browser-added UI element is placed to the left of the existing UI element already positioned in the upper right corner or is placed below the existing UI element already positioned in the upper right corner.

In various examples, the best fit placement policy can vary such that it is established based on factors including the language in which the content of the webpage is being displayed and/or a geographic location in which the computing device displaying the webpage is located. These factors can be configured to accommodate a general population of users (e.g., viewers) and the manner in which they typically traverse (e.g., read, view, interact with) content on a display screen. Consequently, the browser is configured to consistently display (e.g., render) a browser-added UI element on all the images of a webpage or on select images of a webpage, regardless of the website to which the webpage belongs.

In one example, the browser may persistently display browser-added UI elements on the visible parts of images on a webpage. However, in an alternative example and to further lower the probability that the browsing experience intended by a web developer is not interfered with, the browser may be configured to only display the browser-added UI element when a user-controlled pointer element hovers over the visible part of a particular image. Accordingly, the browser is configured to determine when the user-controlled pointer element hovers over the visible part of the image.

Furthermore, the browser can determine when the user-controlled pointer element is positioned to interact with the browser-added UI element (e.g., click on the browser-added UI element, hover over the browser-added UI element). When this interaction occurs, the browser can display a UI window that presents the results (e.g., content) associated with the function. For example, if the browser-added UI element is associated with an image-based search function, the browser can display an embedded UI window with image search results in response to the interaction with the browser-added UI element.

The browser is further configured to address other obstacles with regard to the intelligent placement of the browser-added UI element. For instance, some websites intentionally place large overlay elements on top of the visible parts of images. These large overlay elements are transparent (i.e., not visible to a user) and serve a purpose of preventing the browser from detecting that a user-controlled pointer element is located (e.g., hovering) on a visible part of an image. These large overlays can also be detected via the aforementioned hit test implemented on the visible part of the image. Accordingly, application of the best fit placement policy is configured to eliminate, or ignore, these large overlay elements when identifying a best fit position for the browser-added UI element. In other words, placement of the browser-added UI element does not consider a layout position of a large overlay element. A large overlay element is one that is greater than a predefined threshold size. For example, an overlay element may qualify as a large overlay element if it is more than half of the size of the visible part of the image, more than a quarter of the size of the visible part of the image, and so forth.

Another obstacle is caused by websites that include rounded border ancestor and/or overlay elements on images.

In this situation, the visible part of the image is not a rectangle, but rather a circle or an oval. In this scenario, the browser is configured to determine a size of a rectangle that completely fits within the visible part of the image that has rounded corners (e.g., a rounded border). Then, the hit test and the best fit placement policy can be applied to the rectangle, as described above.

The techniques disclosed herein provide a number of features that improve existing computing devices. For example, the techniques disclosed herein provide an effective technical approach to directing traffic to a browser-initiated function that is not part of a webpage downloaded from a web server, such as an image-based search. This is important because some users do not know these functions are available or even exist, let alone how to access and use them. Efficient access and use mechanisms, such as the one described herein, can conserve computing resources because a user is no longer required to redirect their attention to launch a different application or different functionality. Furthermore, the traffic is directed to the browser-initiated function by intelligent placement of a browser-added UI element that appears, to a user, to be part of the web page. Moreover, the intelligent placement of the browser-added UI elements limits the disruption or interference with the actual web page, thereby improving the user experience. Other technical benefits not specifically mentioned herein can also be realized through implementations of the disclosed subject matter.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for intelligent placement, by a browser, of a user interface (UI) element on a webpage such that the UI element appears to be integrated and coordinated with the webpage. Stated alternatively, the browser does not merely place the UI element in an overlay layer on top of the webpage. The intelligent placement ensures that the UI element neither obstructs the view of pertinent content displayed on the webpage nor interferes with the functionality of the webpage. Moreover, the intelligent placement ensures that the UI element is completely or substantially visible to a user. The placement of the UI element is done by the browser after the webpage has been retrieved (e.g., downloaded) from a web server. Consequently, the browser lacks the ability to control or alter the layout and appearance of the content of the webpage. Rather, the browser is configured to analyze the webpage code so that the UI element can be added to the webpage without any assistance from the web developer.

The UI element can be a selectable UI element (e.g., an icon, a button) that the browser associates with a function. The function can be implemented, or at least initiated, on the browser-side. Accordingly, the function is not one that is part of the webpage and, and as described above, this UI element may be referred to herein as a "browser-added" UI element. In one example, the function can be an image-based search function that uses characteristics of an image (e.g., graphical characteristics, text descriptions in the image metadata, captions) that is displayed on the webpage. Accordingly, upon detecting a user interaction with the browser-added UI element (e.g., a user-controlled pointer element such as a cursor is located on or hovers over the browser-added UI element), the browser can be configured to call on an image search engine to provide links to other websites that may contain images that are similar to the image that is displayed on the webpage. That is, the image search engine can use the characteristics of the image to search for similar images on the Internet.

In the context of image-based search, the browser is configured to place the browser-added UI element on an image displayed on the webpage. To ensure that the user experience with regard to viewing and interacting with webpages is not frustrated by the browser-added UI element, it is important for the browser to position the browser-added UI element so that it does not interfere with existing functionality of the webpage. Various examples, scenarios, and aspects that are described below with reference to FIGS. 1-12.

Figure 1:
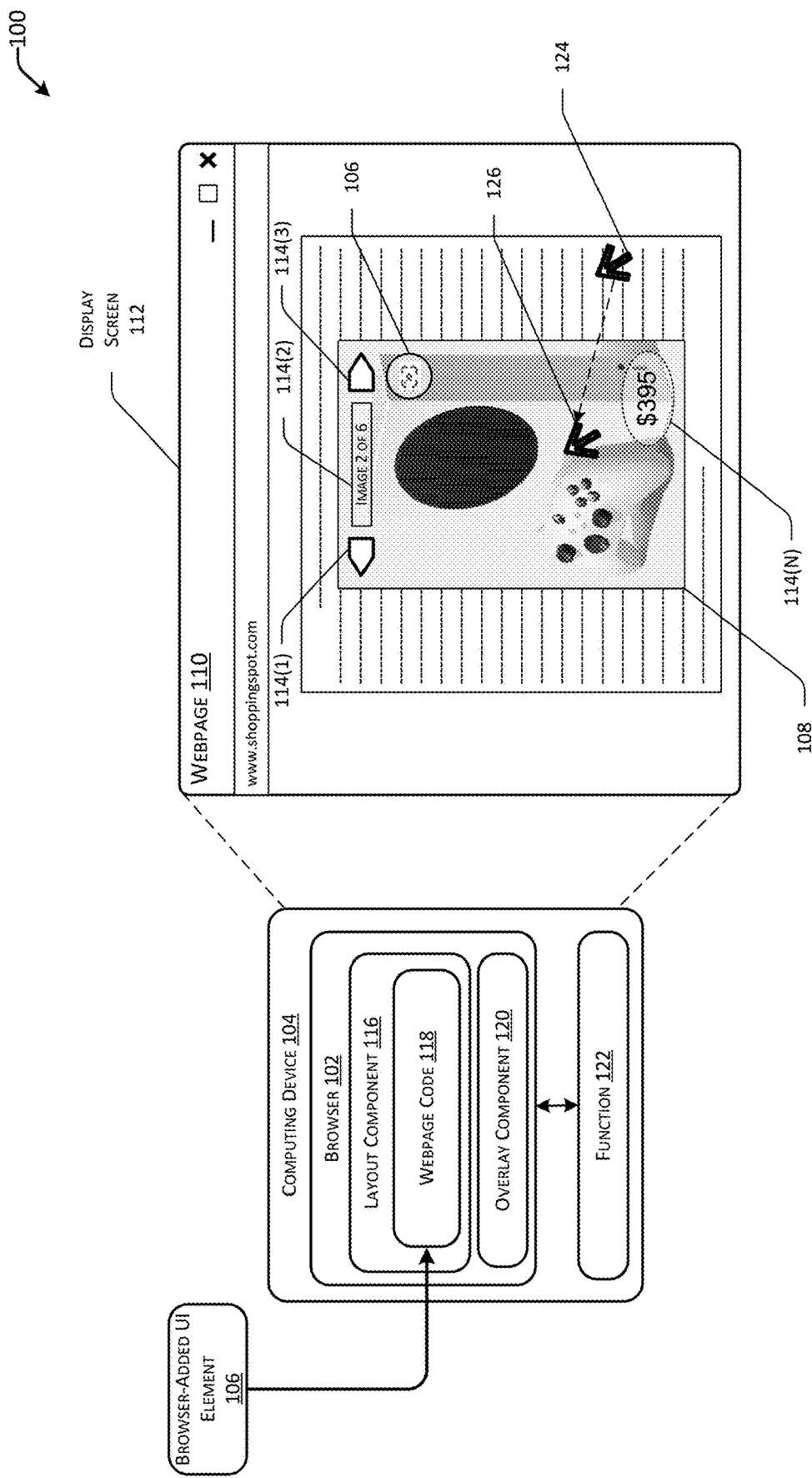
FIG. 1 illustrates an example environment in which a browser executing on a computing device is configured to intelligently place a browser-added user interface (UI) element within a visible part of an image on a webpage such that the browser-added UI element does not interfere with existing UI elements and the browser-added UI element looks like it is part of the webpage.

FIG. 1 illustrates an example environment 100 in which a browser 102 executing on a computing device 104 is configured to intelligently place a browser-added user interface (UI) element 106 within a visible part of an image 108 displayed via a webpage 110. The webpage 110 is displayed via a display screen 112 that is part of the computing device 104, or in some way connected to the computing device 104. As an example described herein, and for ease of discussion, the webpage 110 is an electronic-commerce webpage (e.g., www.shoppingspot.com) that sells items such as a video game console and controller, as shown via image 108.

The browser 102 is configured to position the browser-added UI element 106 such that it does not interfere with existing UI elements 114(1-N) (where N in this context equals one, two, three, four, five, etc.) that are part of the webpage. Consequently, the browser-added UI element 106 looks like it is part of the webpage 110. Examples of existing UI elements 114(1-N) include a left arrow element 114(1) selectable to flip back to a previous image in a series of images associated with the video game console and controller, a non-selectable text element 114(2) that indicates a number of a current image in the series of images ("Image 2 of 6"), a right arrow element 114(1) selectable to flip forward to a next image in the series of images, and a non-selectable text element 114(N) that indicates the price (e.g., $395) of the video game console and controller.

As mentioned above, different web developers of different websites define different experiences, and thus, some webpages may include existing UI elements 114(1-N) displayed on images while others do not. If existing UI elements 114(1-N) are displayed on images, the type of existing UI elements 114(1-N), the number of existing UI elements 114(1-N), the layout positions of the existing UI elements 114(1-N), and/or the size of the existing UI elements 114(1-N) often vary from one website to the next, from one webpage to the next, and even from one image to the next.

Therefore, the browser 102 is configured to intelligently place the browser-added UI element 106 on the image 108 so that it is visible, and more importantly, so that it neither obstructs the view of the existing UI elements 114(1-N) nor interferes with the functionality of existing UI elements 114(1-N) (e.g., the ability for a user to select an existing UI element). As shown, the browser 102 includes a layout component 116 (e.g., a layout process) that is tasked with processing webpage code 118 so that the content of the webpage 110 can be displayed and/or interacted with in accordance with an experience defined by a developer of the webpage 110. The webpage code 118 can include files written in a markup language such as Hypertext Markup Language (HTML), scripts written in a programming language such as JAVASCRIPT, and Cascading Style Sheets (CSSs). The browser 106 is configured to examine the webpage code 118 to identify the layout position of the image 108 within the webpage 110 and/or on the display screen 112. For example, the HTML can describe layout positioning attributes for the image such as an alignment, a margin, an image height (e.g., in pixels), an image width (e.g., in pixels), and so forth.

The browser 102 also includes an overlay component 120 which implements a process to overlay additional content, that is not part of the webpage 110, in an overlay layer. This process is separate from the layout process. Consequently, if the browser 102 displays additional content in the conventional manner using the overlay component 120, the additional content does not look like it is part of or coordinated with the webpage and, more importantly, the additional content is likely to obstruct the view of pertinent elements and/or interfere with the functionality of the webpage 110 (e.g., disable the functionality of selectable existing UI elements 114(1) and/or 114(3)). Therefore, the browser 102 uses the layout component 116, rather than the overlay component 120, to place and display the browser-added UI element 106. In other words, the browser 102 inserts the browser-added UI element 106 into the webpage code 118.

The browser-added UI element 106 can be associated with a function 122 that is implemented, or at least initiated, by the browser 102. Accordingly, the function 122 is not one that is part of the webpage code 118 received from a web server. In one example, the browser 102 is configured to persistently display the browser-added UI element 106 on the image 108 so that it can be selected by a user of the computing device 104. However, in an alternative example and to further lower the probability that the browsing experience intended by a web developer is not interfered with, the browser 102 is configured to only display the browser-added UI element 106 when a user hovers over the visible part of the image 108 on the webpage 110. To illustrate this further, the browser 102 would not display the browser-added UI element 106 when a user-controlled pointer element (e.g., a mouse-controlled cursor) is located at a first position 124 on the display screen 112. However, when the user moves the user-controlled pointer element to a second position 126 where it hovers on or near the image 108, the browser-added UI element 106 is displayed.

Figure 2:
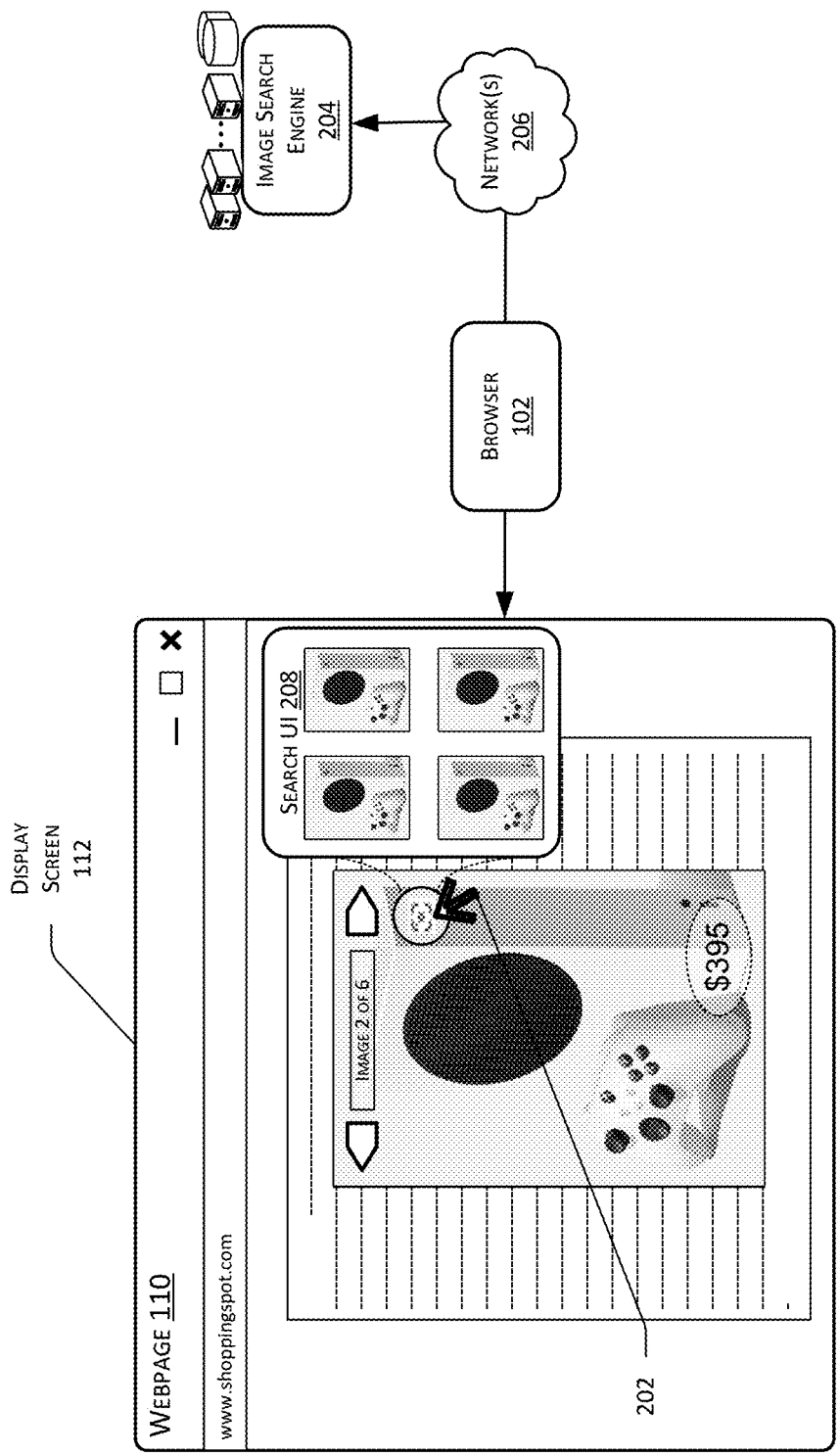
FIG. 2 illustrates a diagram that captures how an image-based search function associated with the browser-added UI element is called upon by the browser.

In one example, the function 122 is an image-based search function. As illustrated in FIG. 2, the browser 102 can implement, or initiate, the image-based search function based on an interaction 202 (e.g., a hover, a selection) between the user-controlled pointer element and the browser-added UI element 106. Based on the interaction 202, the browser 102 can call on an image search engine 204, e.g., over network(s) 206, to use characteristics of the image 108 (e.g., graphical characteristics, text descriptions in the image metadata, captions) to provide links to other websites that may contain images that are the same or similar to the image 108. For example, when the user-controlled pointer element hovers on the browser-added UI element 106, the browser 102 can be configured to display an embedded search UI 208 that presents the same and/or similar images to the user via the display screen 112. The images are found on the Internet by the image search engine 204, and are selectable to take the user from the current webpage 110 to another webpage.

In a specific example, the image-based search function can be useful when a user is shopping for an item on a first website yet wants to compare the price of the item on the first website to prices of the same or similar items on other websites with the hope of finding the same or similar item for a cheaper price. In another example, the image-based search function can be useful when a user is viewing a news article regarding a particular topic on a first website and wants to find similar news articles regarding the particular topic on other websites. Therefore, the browser 102 may be configured to place a browser-added UI element 106 on each of multiple different images currently being displayed via a webpage. Browser-side functions other than an image-based search function are also contemplated in the context of this disclosure.

Figure 3:
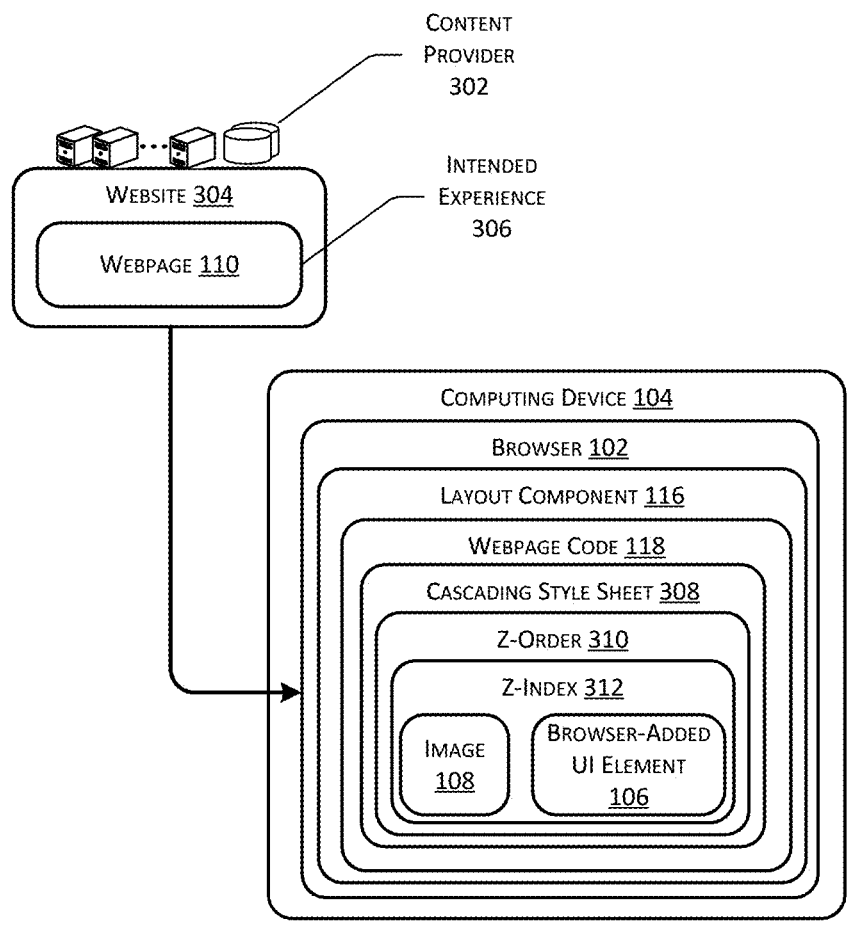
FIG. 3 illustrates a diagram that captures how the browser uses a z-order in a Cascading Style Sheet (CSS) associated with the image to intelligently place the browser-added UI element.

FIG. 3 illustrates a diagram that captures how the browser 102 uses a z-order in a CSS associated with the image 108 to intelligently place the browser-added UI element 106. As shown, the browser 102 executing on the computing device 104 retrieves (e.g., downloads), based on a user instruction, the webpage code 118 for the webpage 110 from a content provider 302 (e.g., web server(s)) that hosts a website 304 to which the webpage 110 belongs. The website 304 and/or the webpage 110 are developed with an intended experience that defines the layout, the position, the functions (e.g., interactivity), etc. of the webpage elements.

In many scenarios, the image 108 and the layout position of the image 108 identified in the webpage code 118 is associated with a CSS 308. The CSS 308 includes a z-order 310 which defines different layers within which elements can be presented. Some websites 304 may use elements to crop the image 108. These elements may be referred to as "ancestor" elements and the cropping is configured using the z-order 310 in the CSS 308. Generally, an element with a greater z-index property in a z-order 310 is in front, or on top, of another element with a lower z-index property in the z-order 310. Stated alternatively, the element with the greater z-index property in the z-order 310 is configured in a higher layer compared to the layer of the other element with the lower z-index property in the z-order 310. In a specific example, an element (e.g., the image 108) with a z-index property of "1" in the z-order 310 is cropped by an ancestor element with a z-index property of "2" in the z-order 310, if the positions of the image 108 and ancestor element overlap. One reason a web developer includes these ancestor elements that crop an image is to prevent a user from copying the image 108 via the webpage 110.

To prevent any potential interference with existing functionality of the webpage 110 (e.g., preventing selections of the existing UI elements 114(1-N)), the layout component 116 of the browser 102 is configured to insert the browser-added UI element 106 in the same z-index 312 (e.g. z-index=0), or same layer, as the image 108. Accordingly, the browser-added UI element 106 is inserted in a layer that is below webpage functionality configured within layers above the image according to the z-order 310 of the CSS 308. This ensures that the browser-added UI element 106 is not a source of interference with existing UI elements 114(1-N) that are part of the webpage experience.

Figure 4:
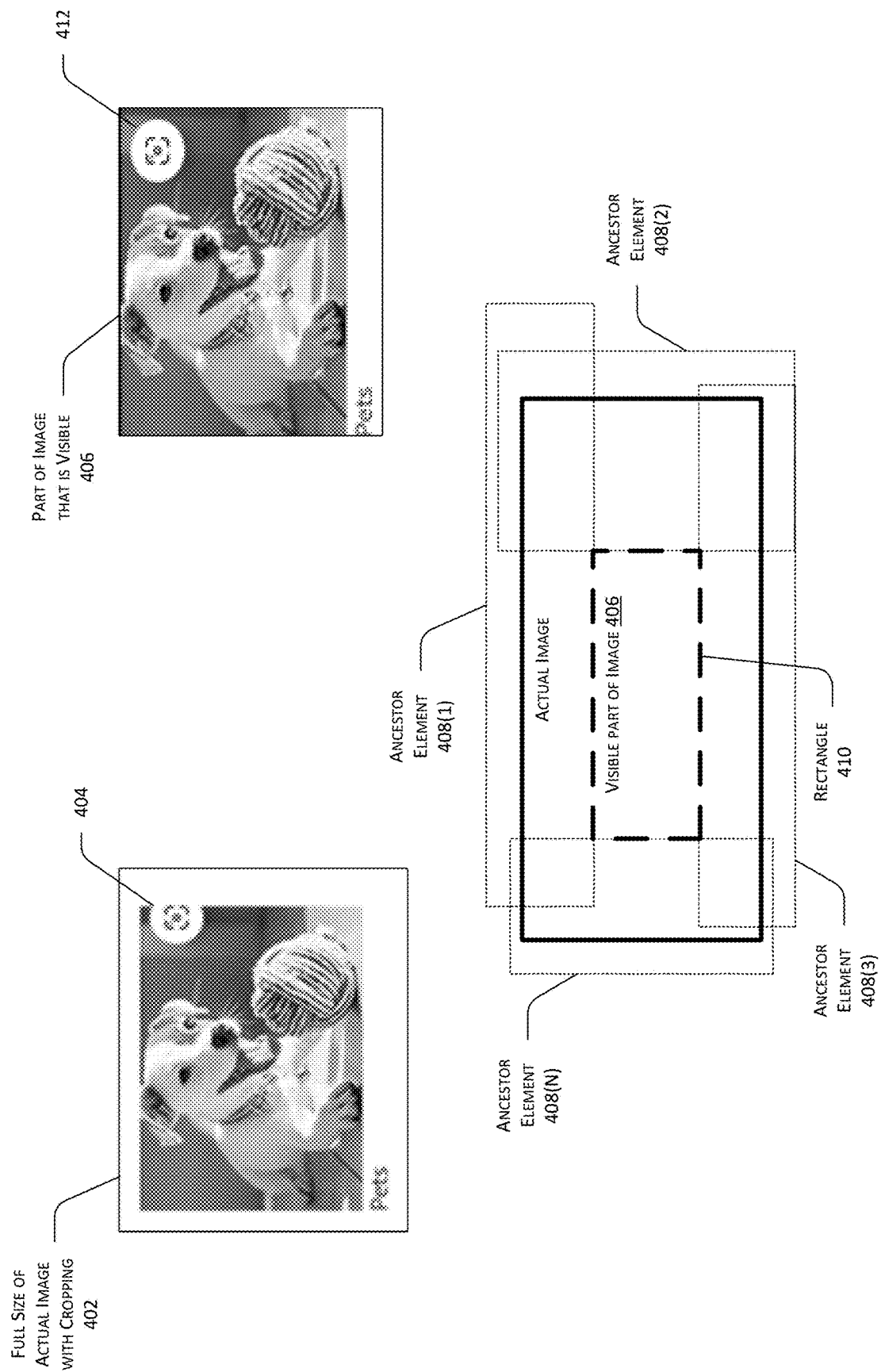
FIG. 4 illustrates a diagram that captures how the browser identifies a visible part of the image, which is useable to intelligently place the browser-added UI element.

FIG. 4 illustrates a diagram that captures how the browser intelligently places the browser-added UI element so that it is fully visible on a webpage. As described above, it may be simpler to implement a general solution that displays the browser-added UI element on an image using preconfigured offsets. For instance, the general solution could always place the browser-added UI element in the upper right corner of an image, a certain distance from the top edge of the image and a certain distance from the right edge of the image. This may be referred to as "static" positioning. However, a problem associated with this general solution relates to the fact that webpages often include their own ancestor elements that crop an image so that the user is unable to see the whole image while viewing the webpage. Stated alternatively, the actual image included in the webpage is often much larger than the part of the image that is visible to the user when the webpage is displayed. The presence and/or the size of these ancestor elements vary from one web site to the next, one webpage to the next, and/or one image to the next.

To illustrate the problem, the image in the upper left portion of FIG. 4 shows a full size of an actual image, portions of which have been cropped 402 by ancestor elements when the image is displayed on webpage. If the browser-added UI element is statically positioned in the same layer as the underlying images, as described above with respect to FIG. 3, the preconfigured offsets based on the actual size of the image do not accommodate the cropping. Consequently, there is a good chance that the browser-added UI element 106 is oddly clipped by an ancestor element, as shown by reference number 404. Even worse, the browser-added UI element 106 may be completely invisible because it is fully covered by an ancestor element.

Accordingly, the browser 102 is configured to determine a part of an image 108 that is visible 406 on the webpage. To do this, the browser 106 identifies the layout positions of the ancestor elements 408(1-N) (where N in this context is one, two, three, four, five, etc.) that overlap the layout position of an image. The browser 102 can determine that the elements are ancestor elements 408(1-N) that crop the image by analyzing a z-order 310 in a CSS 308. For instance, the CSS 308 may define that ancestor elements 408(1-N) have z-indices (e.g., 2, 3, 4, 5) in the z-order 310 that are greater than the image's z-index (e.g., 0, 1) in the z-order 310. Once the layout positions are determined, the browser 102 computes boundaries that enclose a display screen area corresponding to the visible part of the image 406. In one example, the boundaries form a rectangle 410 that defines the part of the image that is visible 406 on the webpage (e.g., a pixel height and a pixel width for the visible part of the image).

The rectangle 410 is used to solve the problem illustrated by element 404. As shown in the upper right portion of FIG. 4, a position 412 for the browser-added UI element 106 is identified within the rectangle 410 that encloses the visible part of the image 406 so the browser 102 can ensure the browser-added UI element is fully visible (e.g., not clipped or completely covered by an ancestor element 408(2)).

Figure 5:
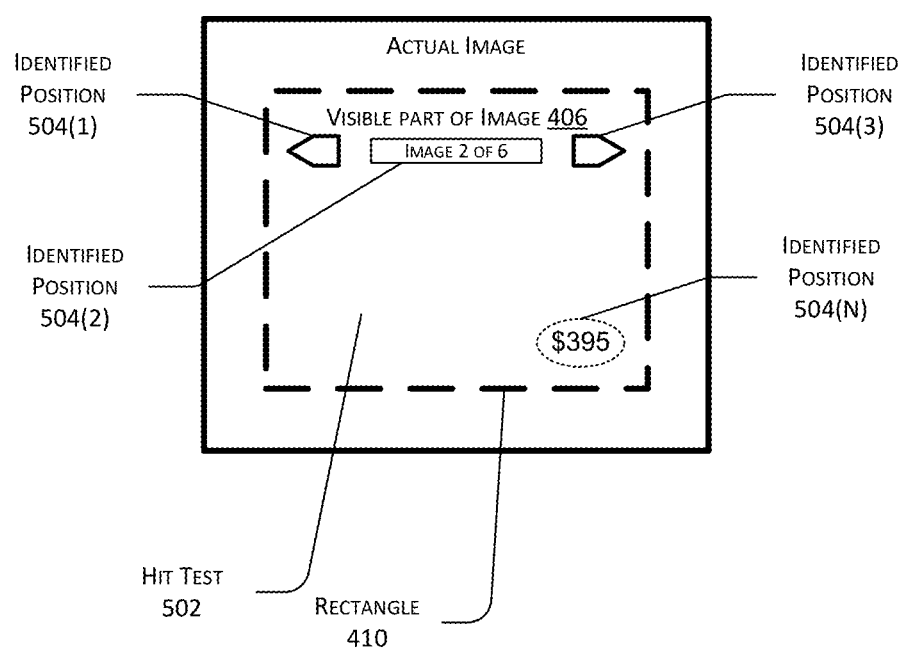
FIG. 5 illustrates a diagram that captures how the browser identifies the layout positions of existing UI elements so that the browser-added UI element can be intelligently placed to avoid interfering with the existing UI elements.

FIG. 5 illustrates a diagram that captures how the browser identifies the locations of existing UI elements so that the browser-added UI element can be intelligently placed to avoid interfering with the existing UI elements. As described above, another problem that relates to the general solution that statically positions the browser-added UI element is that different websites have distinctly different experiences with regard to the number of existing UI elements, the size of the existing UI elements, and the layout positions of the existing UI elements on a visible part of the image.

For instance, a website that offers items for sale may display an existing text element at the top of the images, the existing text element indicating which image out of a series of images is being displayed for an item (e.g., "Image 1 of 3", "Image 2 of 3", "Image 3 of 3"). This is shown in FIG. 1 as an example. A different website may display the same existing text element at the bottom of the images. In another example, some websites that offer items for sale may display an existing text element that indicates a price of the item on the image, while other websites do not. Other types of existing elements that interfere with the placement of the browser-added UI element are commonly used (e.g., selectable elements to flip back and forth through a series of images, a selectable element to receive feedback such as a heart or thumbs-up). These different elements, and more importantly, the variations from one website to the next with regard to the number of existing UI elements, the positioning of existing UI elements, and/or the size of existing UI elements, etc., have a significant effect on the placement of the browser-added UI element. This is because the browser does not want the browser-added UI element to obstruct the view of these existing UI elements, nor interfere with the functionality of these existing UI elements.

Once the browser 102 identifies the visible part of the image 406 (e.g., a display screen area enclosed by the rectangle 410), the browser 102 implements a region hit test 502 on the visible part of the image 406. Stated alternatively, implementation of the hit test 502 is localized to the display screen area that is enclosed by the boundaries of the rectangle 410.

This hit test 502 enables the browser 102 to identify a layout position of an existing UI element (e.g., selectable or not selectable) that intersects with, or is in a layer (e.g., z-index) on top of, the visible part of the image 406. For instance, the browser 102 uses different x-y coordinates of the enclosed area to obtain information (e.g., feedback) regarding whether a user-controlled pointer element (e.g., a mouse cursor or a touch-point on a touch-screen interface) would intersect with the visible part of the image 406 at a particular point (e.g., a pixel) in the x-y coordinate space. The hit test 502 may be conducted on all the points within the enclosed area, or a sampled set of points. If an intersection with the visible part of the image 406 occurs at a particular point, the browser 102 determines that there is no existing UI element at the particular point. If an intersection with the visible part of the image 406 does not occur at a particular point, the browser 102 determines that that there is an existing UI element at the particular point. The browser 102 can aggregate or cluster non-intersecting points to identify the layout position and/or the size (e.g., height, width) of an existing UI element.

As shown in FIG. 5, the hit test 502 identifies positions 504(1-N) on the visible part of the image 406 for existing UI elements. The existing UI elements may be similar to the existing UI elements 114(1-N) on the image 108 in FIG. 1.

Figure 6:
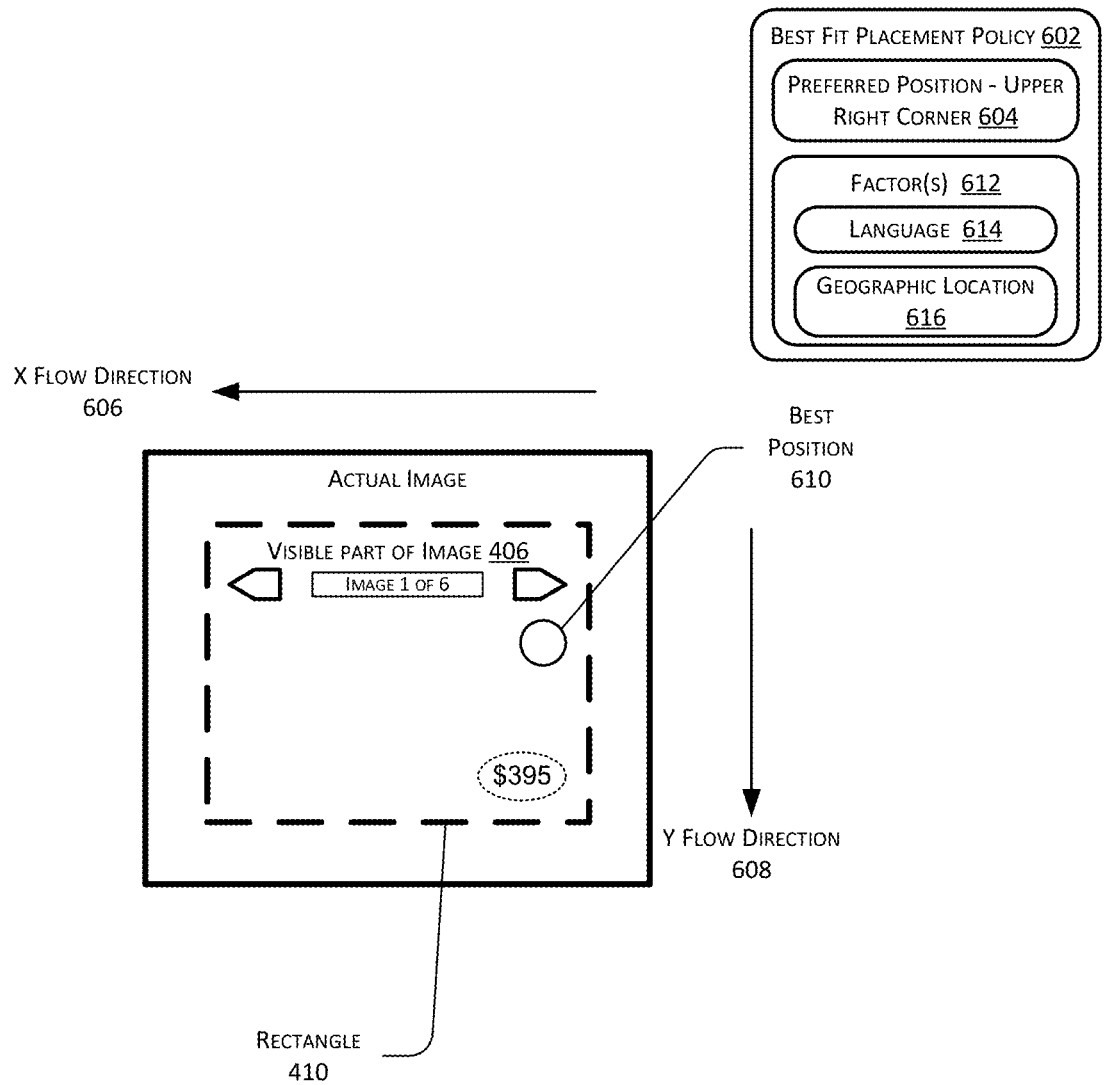
FIG. 6 illustrates a diagram that captures how the browser applies a best fit placement policy to place the browser-added UI element in a consistent and preferred layout position.

FIG. 6 illustrates a diagram that captures how the browser applies a best fit placement policy 602 to position the browser-added UI element. As described above, it is important for the browser 102 to place, or at least attempt to place, the browser-added UI element 106 on different images in a consistent manner. If the browser-added UI element 106 is not placed on different images in a consistent manner, the user is likely to perceive the browser-added UI element 106 as being a random UI element and/or a distractive UI element placed over the content of the webpage. Even worse, the user may perceive the browser-added UI element as being a website compatibility issue that affects the rendering of the webpage.

Now that the browser 102 knows the part of the image that is visible 406 on a display screen and/or the layout positions 504(1-N) of existing UI elements on top of the visible part of the image 406, the browser 102 can apply the best fit placement policy 602 to address the problems discussed above with respect to visibility, obstruction, and interference. The best fit placement policy 602 enables dynamic identification of a layout position for the browser-added UI element 106 within the visible part of the image 406. This layout position is within the boundaries of the visible part of the image (i.e., within the rectangle 410) and avoids overlapping the identified layout positions 504(1-N) of the existing UI elements. For consistency, the best fit placement policy 502 defines a preferred position (e.g., upper right corner 604 of the visible part of the image 406) and attempts to place the browser-added UI element 106 in the preferred position. However, this placement is dependent on whether the browser-added UI element 106 would interfere with existing UI elements.

Accordingly, the preferred position causes the best fit placement policy 602 to define flow directions for both the x-axis (e.g., right to left, left to right) and the y-axis (e.g., top to bottom, bottom to top). The flow directions are used for consistent placement of the browser-added UI element 106 across images on different websites. In the example where the preferred position is the upper right corner 604, the x-axis flow direction is right to left 606 and the y-axis flow direction 608 is top to bottom. The browser is configured to sort the existing UI elements in the flow directions and identify the first, or best, position 610 where the browser-added UI element 106 fits.

The best fit placement policy 602 may prioritize one of the flow directions in case of a conflict with an existing UI element. In the example of FIG. 6, the best fit placement policy 602 attempts to place the browser-added UI element 106 in the upper right corner but an existing UI element is already positioned there. Thus, a priority factor can indicate whether to first move from right to left in the horizontal direction (e.g., along the x-axis) or to first move from top to bottom in the vertical direction (e.g., along the y-axis) to find the next best position. Thus, assuming no interference with an additional existing UI element, the priority would determine whether the browser-added UI element is placed to the left of the existing UI element already positioned in the upper right corner or is placed below the existing UI element already positioned in the upper right corner. FIG. 6 prioritizes the vertical direction and therefore, the best position 610 is located below the existing UI element that is already placed, by the webpage, in the upper right corner.

In various examples, the preferred position and the best fit placement policy 602 can vary such that it is established based on factors 612 including the language 614 in which the content of the webpage is being displayed and/or a geographic location 616 in which the computing device 104 displaying the webpage is located. These factors 612 can be configured to accommodate a general population of users (e.g., viewers) and the manner in which they typically traverse (e.g., read, view, interact with) content on a display screen.

Consequently, the browser 102 is configured to effectively and consistently place a browser-added UI element on some or all the images of a webpage, regardless of an experience defined by a web developer. Using this dynamic placement that interleaves the browser-added UI element with the content of the webpage, the browser-added UI element is more likely to be perceived, by a user, as being an actual part of the webpage.

Figure 7:
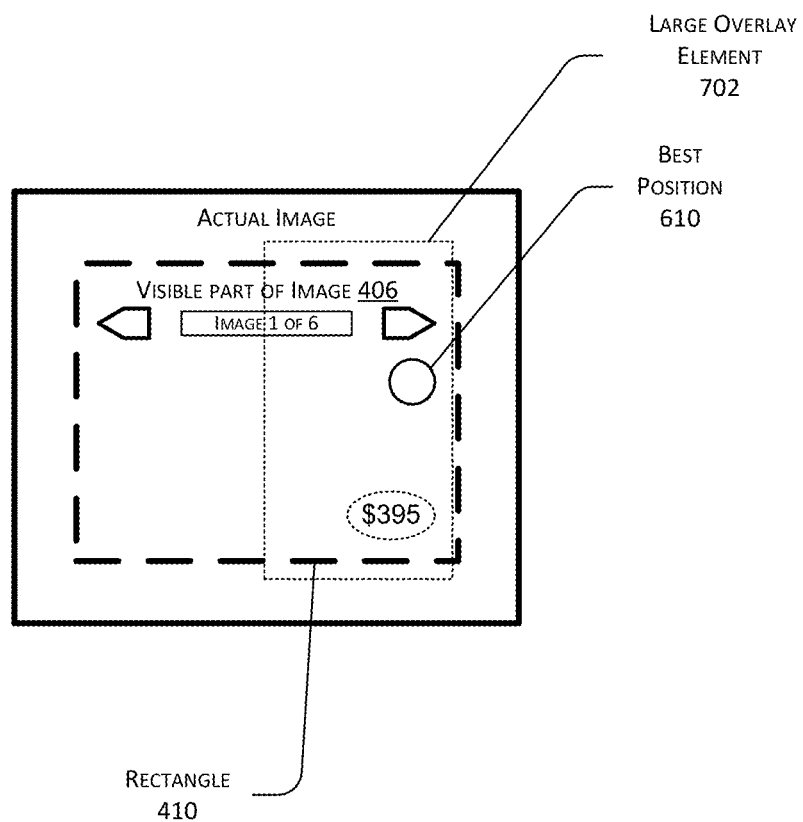
FIG. 7 illustrates a diagram that captures how the browser eliminates or ignores large transparent overlay elements when applying the best fit placement policy.

FIG. 7 illustrates a diagram that captures how the browser eliminates, or ignores, large transparent overlay elements when applying the best fit placement policy. Some websites intentionally place large overlay elements on top of the visible parts of images. These large overlay elements are transparent (i.e., not visible to a user) and serve a purpose of preventing the browser from detecting that a user-controlled pointer element is located (e.g., hovering) on a visible part of an image.

FIG. 7 shows that a large overlay element 702 roughly covers the right half of the visible part of the image 406. The large overlay element 702 can be detected via the hit test 502 implemented on the visible part of the image 406. Trying to avoid these large overlay elements would make it practically impossible for the best fit placement policy 602 to intelligently place the browser-added UI element 106. Accordingly, application of the best fit placement policy 602 can eliminate, or ignore, these large overlay elements 702 when identifying the best position 610 for the browser-added UI element 106. That is, as shown in FIG. 7, the browser-added UI element is placed to avoid overlapping with existing UI elements, but is not placed to avoid overlapping with the large overlay element 702. Stated alternatively, the large overlay element can be removed from consideration (e.g., not sorted) when placing the browser-added UI element.

A large overlay element can be defined as one that is greater than a predefined threshold size. For example, an overlay element may qualify as a large overlay element if it is more than half of the size of the visible part of the image, more than a quarter of the size of the visible part of the image, and so forth.

Figure 8:
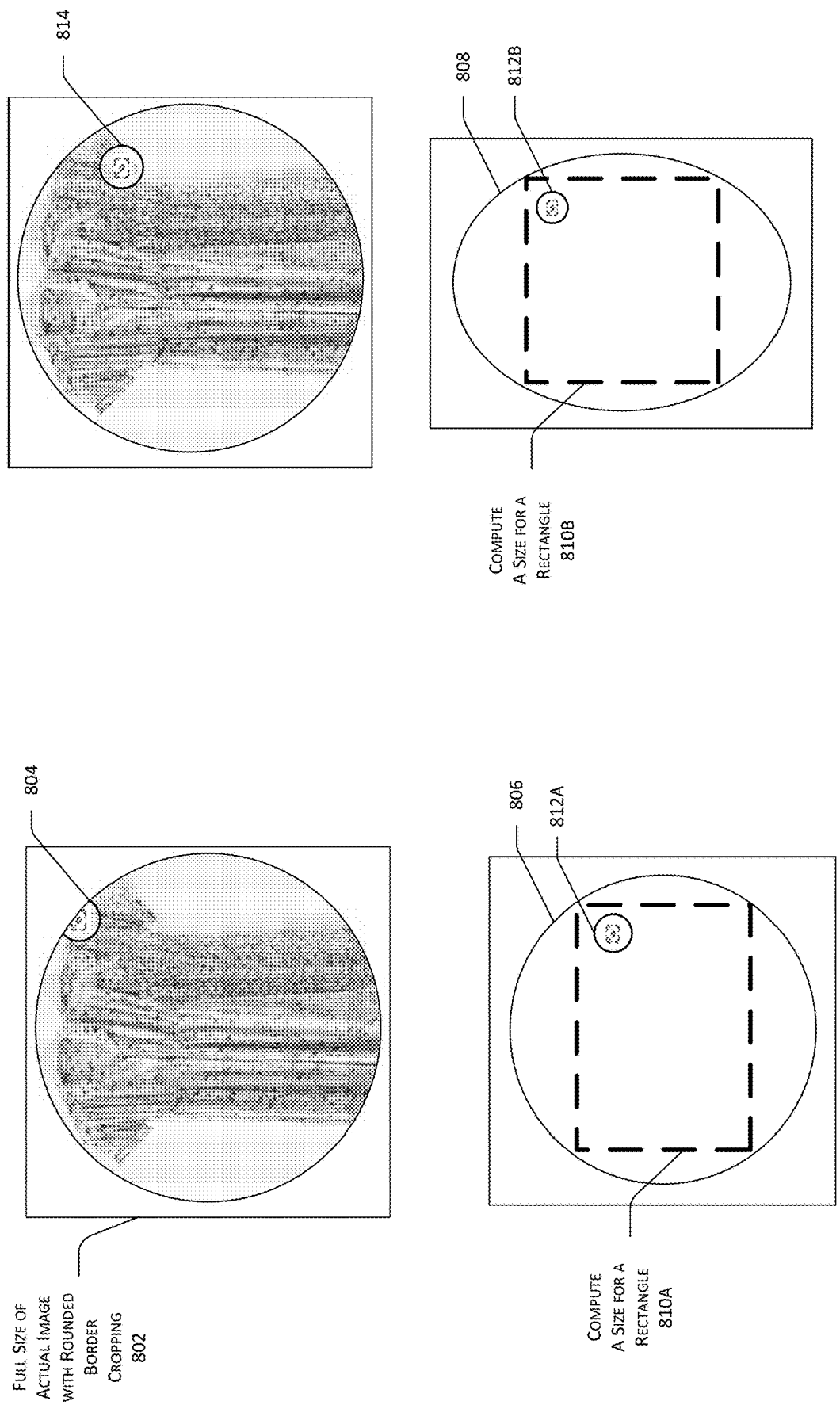
FIG. 8 illustrates a diagram that captures how the browser can accommodate rounded corners when computing a rectangle that is usable to intelligently place the browser-added UI element.

FIG. 8 illustrates a diagram that captures how the browser can accommodate rounded corners when computing a rectangle that is usable to intelligently place the browser-added UI element. As described above, some websites include ancestor and/or overlay element(s) on images such that the full size of the actual image is cropped by a rounded border 802 (e.g., rounded corners). Similar to that shown in FIG. 4, the rounded border may oddly clip the browser-added UI element, as referenced by 804.

In this type of situation, the visible part of the image is not a rectangle, but rather a circle 806, an oval 808, or a shape with rounded corners, as shown in the examples of FIG. 8. Accordingly, the browser 102 is configured to compute a size of a rectangle 810A, 810B that completely fits within the visible part of the image that has rounded corners. Then, the hit test 502 described above with respect to FIG. 5 and the best fit placement policy 602 described above with respect to FIG. 6 can be applied to the rectangle 810A, 810B to ensure that the browser-added UI element 106 is placed in a layout position 812A, 812B where it is completely visible and/or does not interfere with existing UI elements. Thus, rather than the placement shown by reference 804, the rectangle would enable the placement shown by reference 814.

Figure 9:
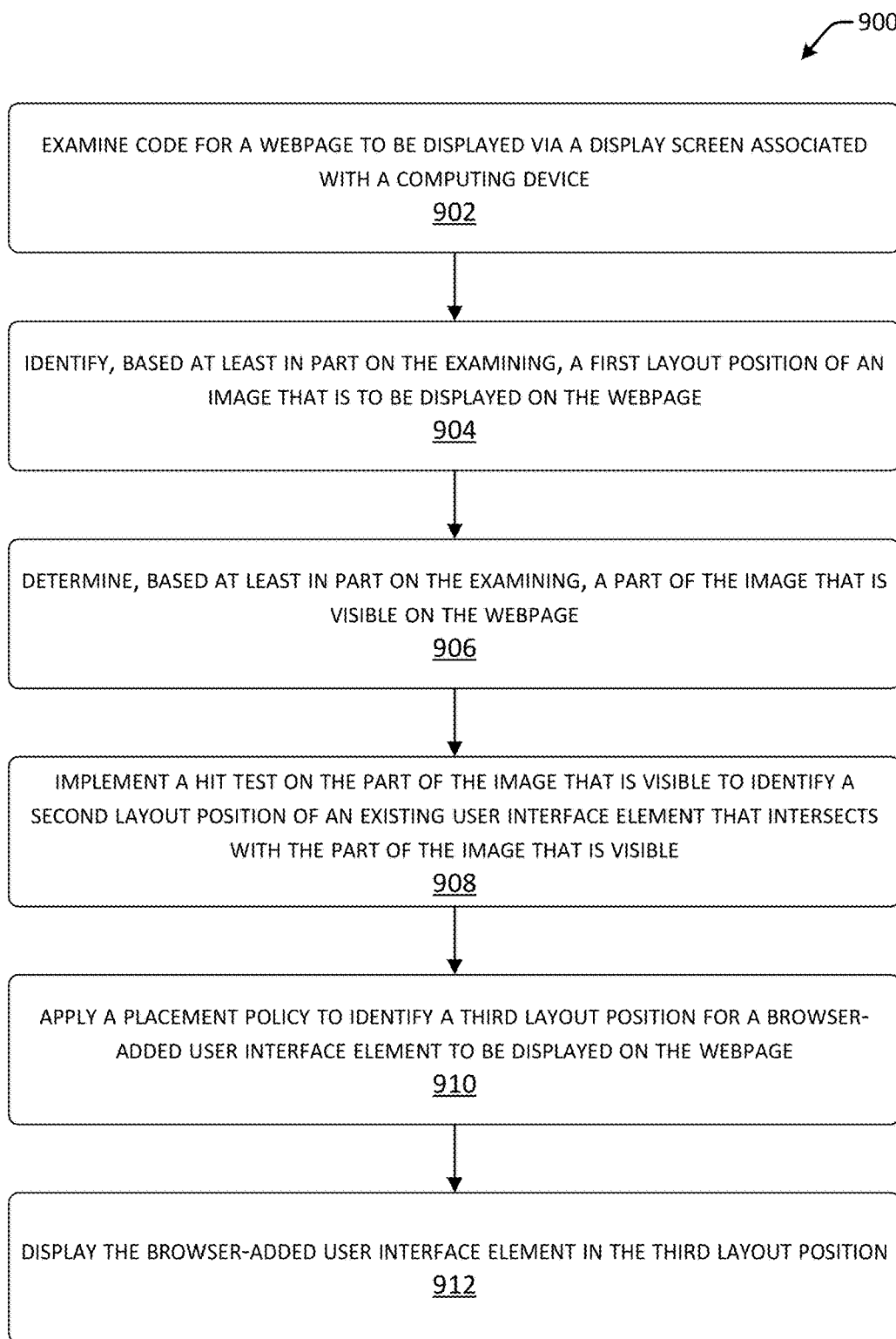
FIG. 9 illustrates a routine for the intelligent placement of a browser-added UI element within a visible part of an image on a webpage.
Figure 10:
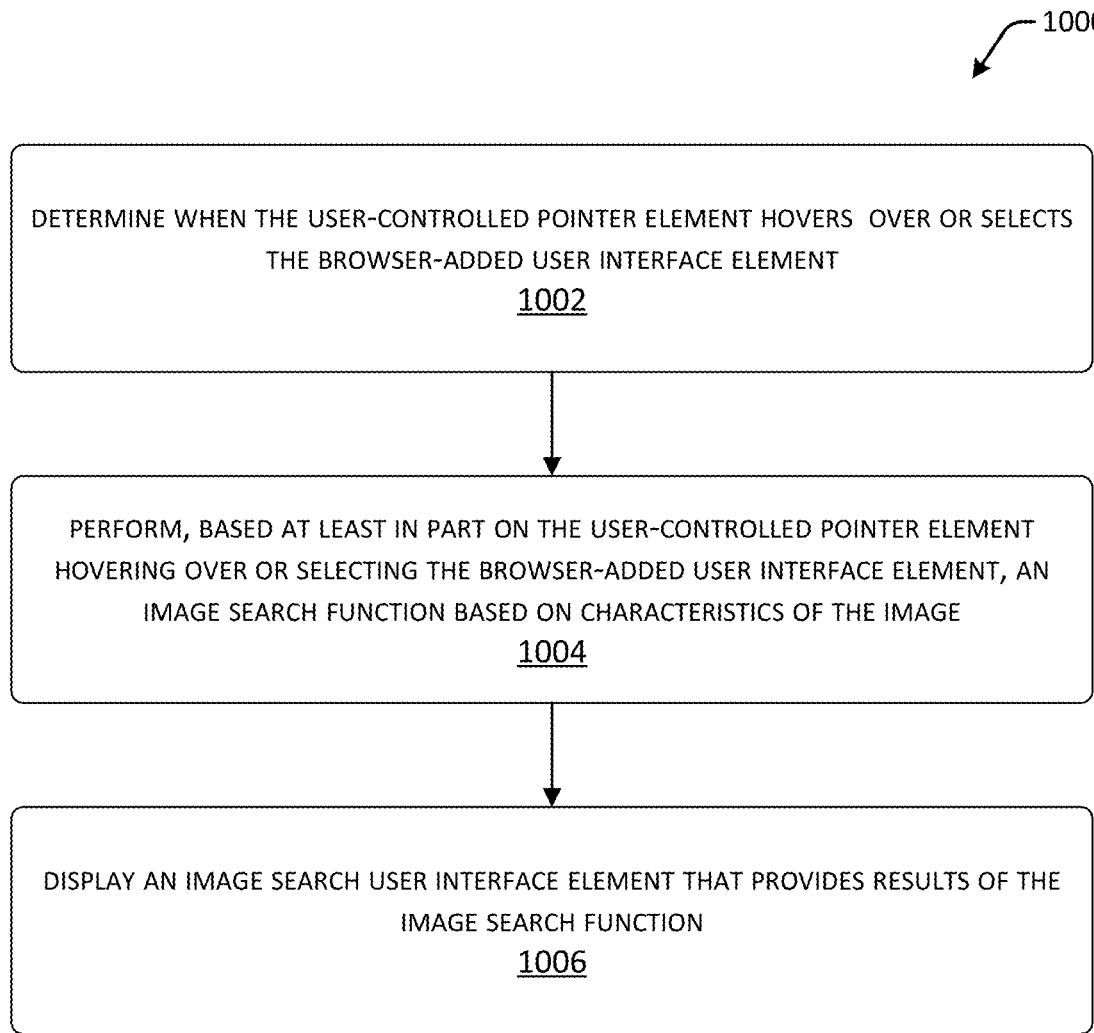
FIG. 10 illustrates a routine for implementing an image-based search function associated with the browser-added UI element.

FIGS. 9 and 10 are flow diagrams showing routines 900, 1000 that illustrates aspects of the mechanisms described above with reference to FIGS. 1-8, according to various embodiments disclosed herein. It should be appreciated that the logical operations described herein with regard to FIGS. 9 and 10 can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in FIGS. 9 and 10. These operations can also be performed in a different order than those described herein.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also contemplated that one or more of the provided operations is modified or omitted.

FIG. 9 illustrates a routine for the intelligent placement of a browser-added UI element within a visible part of an image on a webpage. The routine 900 begins at operation 902, where a browser examines code for a webpage being displayed, or to be displayed, via a display screen associated with a computing device. The code can include HTML, files, JAVASCRIPT, and/or CSS(s).

At operation 904, the browser identifies, based on the examination, a first layout position of an image that is to be displayed on the webpage. Furthermore, at operation 906, the browser determines, based on the examination, a part of the image that is visible on the webpage. This determination is based on the presence, or lack thereof, of ancestor elements and the layout positions of the ancestor elements which crop the image (e.g., on one or more of the right edge, the left edge, the top edge, or the bottom edge). Accordingly, in one example, the part of the image that is visible includes the whole image. In another example, the part of the image that is visible includes a rectangle that encloses a portion of the image that is not the whole image. In a further example, the part of the image that is visible is enclosed by a rounded border (e.g., rounded corners).

At operation 908, the browser implements a hit test on the part of the image that is visible to identify a second layout position of an existing user interface element that intersects with the part of the image that is visible. The existing user interface element is one that is part of the webpage and already displayed on the visible part of the image.

At operation 910, the browser applies a placement policy to identify a third layout position for a browser-added user interface element to be displayed on the webpage. As described above, the third layout position overlays the part of the image that is visible and/or the third layout position avoids overlapping the second layout position of the existing user interface element.

At operation 912, the browser displays the browser-added user interface element in the third layout position. For example, the browser can display the browser-added user interface element when a user-controlled pointer element hovers over the part of the image that is visible on the webpage.

FIG. 10 illustrates a routine for implementing an image-based search function associated with the browser-added UI element. The routine 1000 begins at operation 1002, where the browser determines when the user-controlled pointer element hovers over the browser-added user interface element. In response, at operation 1004, the browser performs a corresponding function such as an image search function based on characteristics of the underlying image. At operation 1006, the browser displays an image search user interface element when the user-controlled pointer element hovers over the browser-added user interface element, the image search user interface element 208 providing results of the image search function.

Figure 11:
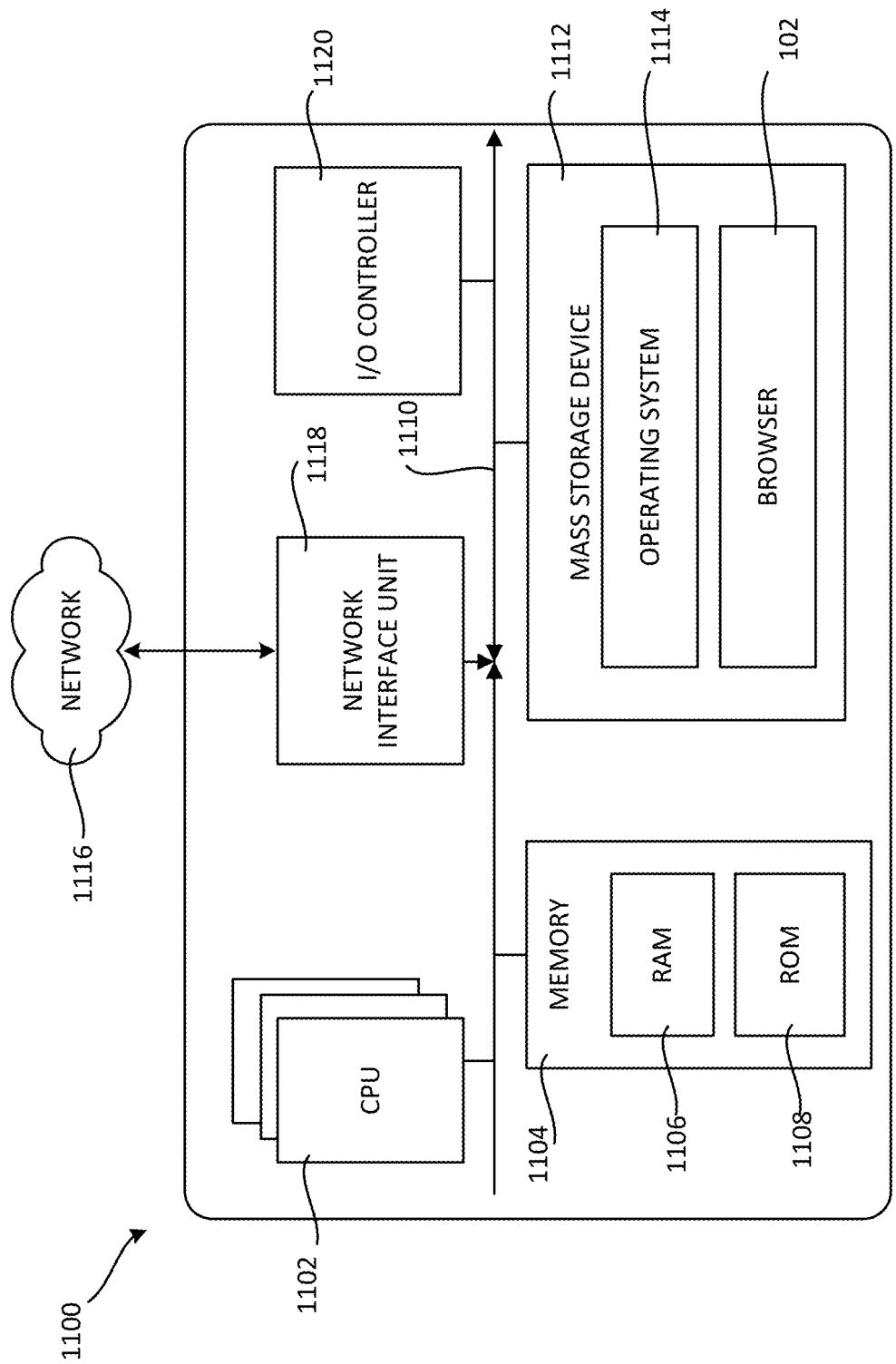
FIG. 11 is a computer architecture diagram showing an illustrative computer hardware and software architecture for a computing device that can implement aspects of the technologies presented herein.

FIG. 11 is a computer architecture diagram showing an illustrative computer hardware and software architecture for a computing device that can implement the various technologies presented herein. In particular, the architecture illustrated in FIG. 11 can be utilized to implement a smartphone device, a tablet device, a laptop device, a desktop device, an AR/VR device, a server, or another type of computing device 104 capable of executing a browser 102.

The computing device 1100 illustrated in FIG. 11 includes a central processing unit 1102 ("CPU"), a system memory 1104, including a random-access memory 1106 ("RAM") and a read-only memory ("ROM") 1108, and a system bus 1110 that couples the memory 1104 to the CPU 1102. A basic input/output system ("BIOS" or "firmware") containing the basic routines that help to transfer information between elements within the computing device 1100, such as during startup, can be stored in the ROM 1108. The computing device 1100 further includes a mass storage device 1112 for storing an operating system 1114, application programs (e.g., such as the browser 102), and/or other types of programs. The mass storage device 1112 can also be configured to store other types of programs and data.

The mass storage device 1112 is connected to the CPU 1102 through a mass storage controller connected to the bus 1110. The mass storage device 1112 and its associated computer readable media provide non-volatile storage for the computing device 1100. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computing device 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 1100. For purposes of the claims, the phrase "computer storage medium," and variations thereof, does not include waves or signals per se or communication media.

According to various configurations, the computing device 1100 can operate in a networked environment using logical connections to remote computers through a network such as the network 1116. The computing device 1100 can connect to the network 1116 through a network interface unit 1118 connected to the bus 1110. It should be appreciated that the network interface unit 1118 can also be utilized to connect to other types of networks and remote computer systems. The computing device 1100 may also include an input/output controller 1120 for receiving and processing input from a number of other devices, including a keyboard, mouse, touch input, an electronic stylus, or a physical sensor such as a video camera. Similarly, the input/output controller 1120 can provide output to a display screen 112 or other type of output device.

It should be appreciated that the software components described herein, when loaded into the CPU 1102 and executed, can transform the CPU 1102 and the overall computing device 1100 from a general-purpose computing device into a special-purpose computing device customized to facilitate the functionality presented herein. The CPU 1102 can be constructed from any number of transistors or other discrete circuit elements, which can individually or collectively assume any number of states. More specifically, the CPU 1102 can operate as a finite-state machine, in response to executable instructions contained within the software modules disclosed herein. These computer-executable instructions can transform the CPU 1102 by specifying how the CPU 1102 transitions between states, thereby transforming the transistors or other discrete hardware elements constituting the CPU 1102.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computing device 1100 in order to store and execute the software components presented herein. It is also contemplated that the computing device 1100 might not include all of the components shown in FIG. 11, can include other components that are not explicitly shown in FIG. 11, or can utilize an architecture completely different than that shown in FIG. 11.

Figure 12:
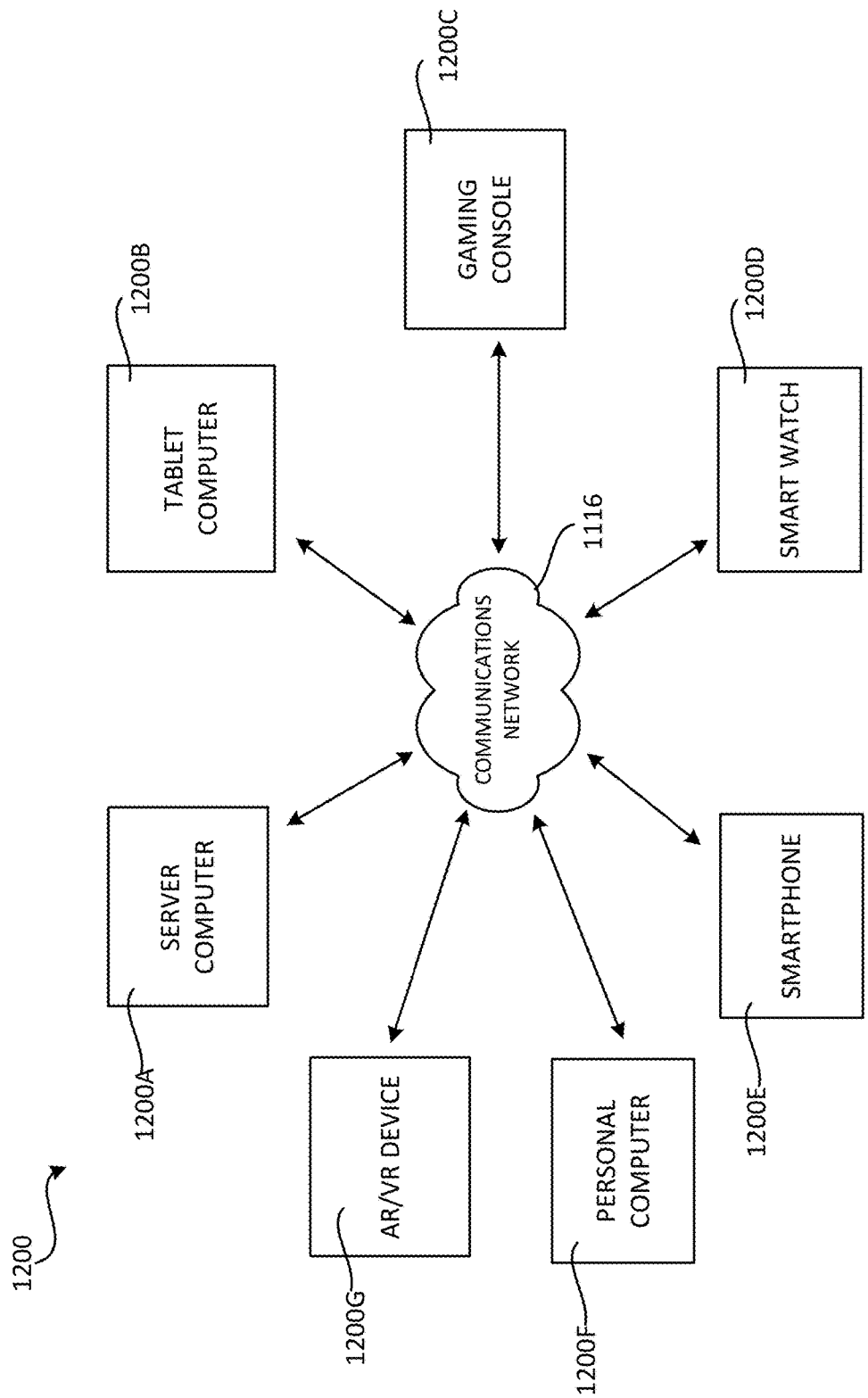
FIG. 12 is a network diagram illustrating a distributed computing environment in which aspects of the disclosed technologies can be implemented.

FIG. 12 is a network diagram illustrating a distributed network computing environment 1200 in which aspects of the disclosed technologies can be implemented, according to various embodiments presented herein. As shown in FIG. 12, one or more server computers 1200A can be interconnected via a communications network 1116 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of computing devices such as, but not limited to, a tablet computer 1200B, a gaming console 1200C, a smart watch 1200D, a smartphone 1200E, a personal computer 1200F, and/or an AR/VR device 1200G.

In a network environment in which the communications network 1116 is the Internet, for example, the server computer 1200A can be a dedicated server computer operable to process and communicate data to and from the computing devices 1200B-1200G via any of a number of known protocols, such as, hypertext transfer protocol ("HTTP"), file transfer protocol ("FTP"), or simple object access protocol ("SOAP"). Additionally, the networked computing environment 1200 can utilize various data security protocols such as secured socket layer ("SSL") or pretty good privacy ("PGP"). Each of the computing devices 1200B-1200G can be equipped with an operating system operable to support one or more computing applications or terminal sessions such as a web browser, or other graphical user interfaces, or a mobile desktop environment to gain access to the server computer 1200A.

The data and/or computing applications may be stored on the server 1200A and communicated to cooperating users through the computing devices 1200B-1200G over an exemplary communications network 1116. A participating user may request access to specific data and applications housed in whole or in part on the server computer 1200A. These data may be communicated between the computing devices 1200B-1200G and the server computer 1200A for processing and storage.

The server computer 1200A can host computing applications, processes and applets for the generation, authentication, encryption, and communication of data and applications, and may cooperate with other server computing environments, third party service providers, network attached storage ("NAS"), and storage area networks ("SAN") to realize application/data transactions.

It should be appreciated that the computing architecture shown in FIG. 11 and the distributed network computing environment shown in FIG. 12 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses.

Example Clause A, a method implemented by a browser operating on a computing device, comprising: examining code for a webpage to be displayed via a display screen associated with the computing device; identifying, based at least in part on the examining, a first layout position of an image 108 that is to be displayed on the webpage; determining, based at least in part on the examining, a rectangle that encloses a part of the image that is visible on the webpage; implementing a hit test on the rectangle to identify a second layout position of an existing user interface element that intersects with the part of the image that is visible on the webpage; applying a placement policy to identify a third layout position for a browser-added user interface element to be displayed on the webpage, wherein the third layout position is within the rectangle that encloses the part of the image that is visible and the third layout position avoids overlapping the second layout position of the existing user interface element; determining when a user-controlled pointer element hovers over the rectangle that encloses the part of the image that is visible on the webpage; and displaying the browser-added user interface element in the third layout position when the user-controlled pointer element hovers over the rectangle that encloses the part of the image that is visible on the webpage.

Example Clause B, the method of Example Clause A, wherein the browser-added user interface element enables the browser to implement or initiate a function that is not part of the webpage.

Example Clause C, the method of Example Clause B, wherein the function comprises an image search function, and the method further comprises: determining when the user-controlled pointer element hovers over the browser-added user interface element; performing, based at least in part on the user-controlled pointer element hovering over the browser-added user interface element, the image search function based on characteristics of the image; and displaying an image search user interface element when the user-controlled pointer element hovers over the browser-added user interface element, the image search user interface element providing results of the image search function.

Example Clause D, the method of any one of Example Clauses A through C, wherein: the code for the webpage includes a Cascading Style Sheet (CSS) associated with the image; and determining the rectangle that encloses the part of the image that is visible on the webpage comprises identifying, within the CSS, a fourth layout position of an ancestor element that overlaps the first layout position of the image, wherein the CSS defines a first z-index, in a z-order, for the ancestor element and a second z-index, in the z-order, for the image, the first z-index being greater than the second z-index thereby causing the ancestor element to crop the image.

Example Clause E, the method of Example Clause D, further comprising inserting the browser-added user interface element in the second z-index in the z-order for the image.

Example Clause F, the method of any one of Example Clauses A through E, wherein the placement policy includes a horizontal flow direction and a vertical flow direction to allow for consistent placement of the browser-added user interface element across a series of images.

Example Clause G, the method of Example Clause F, wherein at least one of the horizontal flow direction and the vertical flow direction is established based at least on one of a language of text in the webpage or a geographic location in which the computing device is located.

Example Clause H, the method of any one of Example Clauses A through G, wherein: the hit test identifies a fourth layout position of an overlay element that is transparent to a viewer of the webpage and that is greater than a threshold size; and application of the placement policy does not avoid overlapping the fourth layout position of the overlay element.

Example Clause I, the method of any one of Example Clauses A through H, wherein: the rectangle defines points in a coordinate space; and the hit test provides information regarding whether the user-controlled pointer element intersects with the part of the image that is visible at each of the points.

Example Clause J, the method of any one of Example Clauses A through I, wherein identifying the first layout position of the image includes identifying at least one of an alignment attribute for the image, a margin attribute for the image, a width attribute for the image, or a height attribute for the image.

Example Clause K, a computing device comprising: at least one processor; and a computer-readable storage medium having computer-executable instructions stored thereupon which, when executed by the at least one processor, cause a browser of the computing device to perform operations comprising: examining code for a webpage to be displayed via a display screen associated with the computing device; identifying, based at least in part on the examining, a first layout position of an image that is to be displayed on the webpage; determining, based at least in part on the examining, a part of the image that is visible on the webpage; implementing a hit test on the part of the image that is visible to identify a second layout position of an existing user interface element that intersects with the part of the image that is visible on the webpage; applying a placement policy to identify a third layout position for a browser-added user interface element to be displayed on the webpage, wherein the third layout position overlays the part of the image that is visible and the third layout position avoids overlapping the second layout position of the existing user interface element; and displaying the browser-added user interface element in the third layout position.

Example Clause L, the computing device of Example Clause K, wherein the browser-added user interface element enables the browser to implement or initiate a function that is not part of the webpage.

Example Clause M, the computing device of Example Clause K or Example Clause L, wherein: the code for the webpage includes a Cascading Style Sheet (CSS) associated with the image; and determining the part of the image that is visible on the webpage comprises identifying, within the CSS, a fourth layout position of an ancestor element that overlaps the first layout position of the image, wherein the CSS defines a first z-index, in a z-order, for the ancestor element and a second z-index, in the z-order, for the image, the first z-index being greater than the second z-index thereby causing the ancestor element to crop the image.

Example Clause N, the computing device of Example Clause M, wherein: the ancestor element crops the image such that a corner of the visible part of the image is rounded; and the operations further comprising determining a rectangle that fits within the corner of the visible part of the image that is rounded, wherein the rectangle represent the visible part of the image on which the hit test is implemented and the browser-added user interface element is displayed.

Example Clause O, the computing device of Example Clause M or Example Clause N, further comprising inserting the browser-added user interface element in the second z-index in the z-order for the image.

Example Clause P, the computing device of any one of Example Clauses K through O, wherein the placement policy includes a horizontal flow direction and a vertical flow direction to allow for consistent placement of the browser-added user interface element across a series of images.

Example Clause Q, the computing device of Example Clause P, wherein at least one of the horizontal flow direction of the vertical flow direction is established based at least on one of a language of text in the webpage or a geographic location in which the computing device is located.

Example Clause R, a method implemented by a browser operating on a computing device, comprising: examining code for a webpage to be displayed via a display screen associated with the computing device; identifying, based at least in part on the examining, a first layout position of an image that is to be displayed on the webpage; determining, based at least in part on the examining, a part of the image that is visible on the webpage; identifying a second layout position for a browser-added user interface element to be displayed on the webpage, wherein the second layout position overlays the part of the image that is visible; and displaying the browser-added user interface element in the second layout position.

Example Clause S, the method of Example Clause R, wherein: the code for the webpage includes a Cascading Style Sheet (CS S) associated with the image; and determining the part of the image that is visible on the webpage comprises identifying, within the CSS, a third layout position of an ancestor element that overlaps the first layout position of the image, wherein the CSS defines a first z-index, in a z-order, for the ancestor element and a second z-index, in the z-order, for the image, the first z-index being greater than the second z-index thereby causing the ancestor element to crop the image.

Example Clause T, the method of Example Clause S, further comprising inserting the browser-added user interface element in the second z-index in the z-order for the image to prevent the browser-added user interface element from interfering with the functionality of existing user interface elements.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different computing UI elements, two different layout positions).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A method implemented by a browser operating on a computing device, comprising:
    examining code for a webpage to be displayed via a display screen associated with the computing device;
    identifying, based at least in part on the examining, a first layout position of an image that is to be displayed on the webpage;
    determining, based at least in part on the examining, a rectangle that encloses a part of the image that is visible on the webpage;
    implementing a hit test on the rectangle to identify a second layout position of an existing user interface element that is placed on the part of the image that is visible on the webpage, wherein the existing user interface element is part of the webpage;
    applying a placement policy to identify a third layout position for a browser-added user interface element to be displayed on the webpage, wherein:
        the third layout position is within the rectangle that encloses the part of the image that is visible and the third layout position avoids overlapping the second layout position of the existing user interface element; and
        the placement policy allows for consistent placement of the browser-added user interface element across a plurality of images;
    determining when a user-controlled pointer element hovers over the rectangle that encloses the part of the image that is visible on the webpage; and
    displaying the browser-added user interface element in the third layout position when the user-controlled pointer element hovers over the rectangle that encloses the part of the image that is visible on the webpage.

2. The method of claim 1, wherein the browser-added user interface element enables the browser to implement or initiate a function that is not part of the webpage.

3. The method of claim 2, wherein the function comprises an image search function, and the method further comprises:
    determining when the user-controlled pointer element hovers over the browser-added user interface element;
    performing, based at least in part on the user-controlled pointer element hovering over the browser-added user interface element, the image search function based on characteristics of the image; and
    displaying an image search user interface element when the user-controlled pointer element hovers over the browser-added user interface element, the image search user interface element providing results of the image search function.

4. The method of claim 1, wherein:
    the code for the webpage includes a Cascading Style Sheet (CSS) associated with the image; and
    determining the rectangle that encloses the part of the image that is visible on the webpage comprises identifying, within the CSS, a fourth layout position of an ancestor element that overlaps the first layout position of the image, wherein the CSS defines a first z-index, in a z-order, for the ancestor element and a second z-index, in the z-order, for the image, the first z-index being greater than the second z-index thereby causing the ancestor element to crop the image.

5. The method of claim 4, further comprising inserting the browser-added user interface element in the second z-index in the z-order for the image.

6. The method of claim 1, wherein the placement policy includes a horizontal flow direction and a vertical flow direction.

7. The method of claim 6, wherein at least one of the horizontal flow direction and the vertical flow direction is established based at least on one of a language of text in the webpage or a geographic location in which the computing device is located.

8. The method of claim 1, wherein:
    the hit test identifies a fourth layout position of an overlay element that is transparent to a viewer of the webpage and that is greater than a threshold size; and
    application of the placement policy does not avoid overlapping the fourth layout position of the overlay element.

9. The method of claim 1, wherein:
    the rectangle defines points in a coordinate space; and
    the hit test provides information regarding whether the user-controlled pointer element intersects with the part of the image that is visible at each of the points.

10. The method of claim 1, wherein identifying the first layout position of the image includes identifying at least one of an alignment attribute for the image, a margin attribute for the image, a width attribute for the image, or a height attribute for the image.

11. A computing device comprising:
    at least one processor; and
    a computer-readable storage medium having computer-executable instructions stored thereupon which, when executed by the at least one processor, cause a browser of the computing device to perform operations comprising:
        examining code for a webpage to be displayed via a display screen associated with the computing device;
        identifying, based at least in part on the examining, a first layout position of an image that is to be displayed on the webpage;
        determining, based at least in part on the examining, a part of the image that is visible on the webpage;
        implementing a hit test on the part of the image that is visible to identify a second layout position of an existing user interface element that is placed on the part of the image that is visible on the webpage, wherein the existing user interface element is part of the webpage;
        applying a placement policy to identify a third layout position for a browser-added user interface element to be displayed on the webpage, wherein:
            the third layout position overlays the part of the image that is visible and the third layout position avoids overlapping the second layout position of the existing user interface element; and
            the placement policy allows for consistent placement of the browser-added user interface element across a plurality of images; and
        displaying the browser-added user interface element in the third layout position.

12. The computing device of claim 11, wherein the browser-added user interface element enables the browser to implement or initiate a function that is not part of the webpage.

13. The computing device of claim 11, wherein:
    the code for the webpage includes a Cascading Style Sheet (CSS) associated with the image; and determining the part of the image that is visible on the webpage comprises identifying, within the CSS, a fourth layout position of an ancestor element that overlaps the first layout position of the image, wherein the CSS defines a first z-index, in a z-order, for the ancestor element and a second z-index, in the z-order, for the image, the first z-index being greater than the second z-index thereby causing the ancestor element to crop the image.

14. The computing device of claim 13, wherein:

the ancestor element crops the image such that a corner of the visible part of the image is rounded; and the operations further comprise determining a rectangle that fits within the corner of the visible part of the image that is rounded, wherein the rectangle represent the visible part of the image on which the hit test is implemented and the browser-added user interface element is displayed.

15. The computing device of claim 13, wherein the operations further comprise inserting the browser-added user interface element in the second z-index in the z-order for the image.

16. The computing device of claim 11, wherein the placement policy includes a horizontal flow direction and a vertical flow direction.

17. The computing device of claim 16, wherein at least one of the horizontal flow direction or the vertical flow direction is established based at least on one of a language of text in the webpage or a geographic location in which the computing device is located.

18. A computer-readable storage medium having computer-executable instructions stored thereupon which, when executed by at least one processor, cause a browser of a computing device to perform operations comprising:

examining code for a webpage to be displayed via a display screen associated with the computing device;

identifying, based at least in part on the examining, a first layout position of an image that is to be displayed on the webpage;

determining, based at least in part on the examining, a part of the image that is visible on the webpage;

implementing a hit test on the part of the image that is visible to identify a second layout position of an existing user interface element that is placed on the part of the image that is visible on the webpage, wherein the existing user interface element is part of the webpage;

applying a placement policy to identify a third layout position for a browser-added user interface element to be displayed on the webpage, wherein:

the third layout position overlays the part of the image that is visible and the third layout position avoids overlapping the second layout position of the existing user interface element; and the placement policy allows for consistent placement of the browser-added user interface element across a plurality of images; and displaying the browser-added user interface element in the third layout position.

19. The computer-readable storage medium of claim 18, wherein the browser-added user interface element enables the browser to implement or initiate a function that is not part of the webpage.

20. The computer-readable storage medium of claim 18, wherein:

the code for the webpage includes a Cascading Style Sheet (CSS) associated with the image;

determining the part of the image that is visible on the webpage comprises identifying, within the CSS, a fourth layout position of an ancestor element that overlaps the first layout position of the image, wherein the CSS defines a first z-index, in a z-order, for the ancestor element and a second z-index, in the z-order, for the image, the first z-index being greater than the second z-index thereby causing the ancestor element to crop the image; and the operations further comprise inserting the browser-added user interface element in the second z-index in the z-order for the image.

\* \* \* \* \*